(12) United States Patent
Myszka et al.

(10) Patent No.: US 12,398,801 B2
(45) Date of Patent: Aug. 26, 2025

(54) METHOD AND CONTROL APPARATUS FOR OPERATING A TRANSMISSION OF A MOTOR VEHICLE

(71) Applicant: ZF Friedrichshafen AG, Friedrichshafen (DE)

(72) Inventors: Paul Myszka, Eriskirch (DE); Fabian Lebherz, Wasserburg (DE); Matthias Wild, Salem (DE); Jens Weller, Constance (DE); Jörg Arnold, Immenstaad (DE); Jürgen Blaser, Meckenbeuren (DE); Ulf Lang, Aidlingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/545,166

(22) Filed: Dec. 19, 2023

(65) Prior Publication Data
US 2024/0200653 A1 Jun. 20, 2024

(30) Foreign Application Priority Data
Dec. 20, 2022 (DE) ...................... 10 2022 214 068.0

(51) Int. Cl.
*F16H 47/08* (2006.01)
*F16H 3/66* (2006.01)
(Continued)

(52) U.S. Cl.
CPC ......... *F16H 61/0403* (2013.01); *F16H 47/08* (2013.01); *F16H 59/40* (2013.01);
(Continued)

(58) Field of Classification Search
CPC .......... F16H 47/08; F16H 59/40; F16H 59/68; F16H 59/0403; F16H 59/682;
(Continued)

(56) References Cited

U.S. PATENT DOCUMENTS 4,579,015 A * 4/1986 Fukui ...................... F16H 3/097
74/357
4,616,521 A * 10/1986 Akashi .................... F16H 61/04
477/80
(Continued)

FOREIGN PATENT DOCUMENTS

| DE | 10 2011 076 964 A1 | 12/2012 | |
|----|----|----|----|
| DE | 10 2014 216 245 A1 | 2/2016 | |
| DE | 102019209640 A1 * | 1/2020 | ........... F16H 37/046 |
| DE | 10 2022 214 068 B3 | 3/2024 | |

OTHER PUBLICATIONS

German Patent Office, Office Action issued in German patent application No. 10 2022 214 070.2 (Jul. 28, 2023).
(Continued)

*Primary Examiner* — Tinh Dang
(74) *Attorney, Agent, or Firm* — Finch & Maloney PLLC

(57) ABSTRACT

A transmission between a drive aggregate and a drive output of a vehicle drivetrain has a hydrodynamic starting element and a powershiftable main transmission with a plurality of forward gears, at least one reversing gear, a transmission input, a transmission output, and frictional shifting elements. In each gear a first number of shifting elements are closed and a second number of shifting elements are open. A downstream range group has at least one interlocking shifting element which can be shifted between a first and second driving ranges. With the drive aggregate running, the vehicle at a standstill or nearly so, the main transmission in neutral, and a shift request received to change the downstream range group, shifting elements of the main transmission are actuated, thereby bracing the transmission input against a transmission housing and decoupling the transmission input from the transmission output. The downstream range group is then shifted.

12 Claims, 3 Drawing Sheets

(51) Int. Cl.
*F16H 59/40* (2006.01)
*F16H 59/68* (2006.01)
*F16H 61/04* (2006.01)
*F16H 61/682* (2006.01)
*F16H 61/70* (2006.01)

(52) U.S. Cl.
CPC .......... *F16H 59/68* (2013.01); *F16H 61/682* (2013.01); *F16H 2059/6823* (2013.01); *F16H 2061/047* (2013.01); *F16H 2061/0474* (2013.01); *F16H 2200/2046* (2013.01); *F16H 2200/2048* (2013.01); *F16H 2200/2051* (2013.01); *F16H 2200/2053* (2013.01); *F16H 2200/2056* (2013.01); *F16H 2200/2058* (2013.01); *F16H 2200/2061* (2013.01); *F16H 2200/2064* (2013.01); *F16H 2200/2094* (2013.01)

(58) Field of Classification Search
CPC ....... F16H 2059/6823; F16H 2061/047; F16H 2061/0474; F16H 2200/0004–2097; F16H 2200/2041–2064; F16H 2200/2094
See application file for complete search history.

(56) References Cited

U.S. PATENT DOCUMENTS

| | | | |
|---|---|---|---|
| 4,637,278 A * | 1/1987 | Nishikawa | F16H 61/0206 477/94 |
| 4,700,819 A * | 10/1987 | Nishikawa | F16H 61/143 74/731.1 |
| 6,128,974 A | 10/2000 | Hughes | |
| 6,463,823 B2 | 10/2002 | Walker | |
| 6,732,601 B2 * | 5/2004 | Suzuki | F16H 3/089 192/3.61 |
| 8,418,575 B2 | 4/2013 | Schneider et al. | |
| 8,869,642 B2 | 10/2014 | Maurer | |
| 10,119,580 B2 * | 11/2018 | Sakamoto | F16H 37/0846 |
| 2014/0171263 A1 | 6/2014 | Steinborn et al. | |
| 2023/0175583 A1 | 6/2023 | Blaser | |

OTHER PUBLICATIONS

German Patent Office, Office Action issued in German patent application No. 10 2022 214 068.0 (Jul. 28, 2023).
United States Patent Office, Notice of Allowance issued in U.S. Appl. No. 18/545,135 (Aug. 7, 2024).

* cited by examiner

|    | A | B | C | D | E |
|----|---|---|---|---|---|
| D1 | • | • | • |   |   |
| D2 | • | • |   |   | • |
| D3 |   | • | • |   | • |
| D4 |   | • |   | • | • |
| D5 |   | • | • | • |   |
| D6 |   |   | • | • | • |
| D7 | • |   | • | • |   |
| D8 | • |   |   | • | • |
| R  | • | • |   | • |   |

METHOD AND CONTROL APPARATUS FOR OPERATING A TRANSMISSION OF A MOTOR VEHICLE

RELATED APPLICATIONS

This application claims the benefit of and right of priority under 35 U.S.C. § 119 to German Patent Application no. 10 2022 214 068.0, filed on 20 Dec. 2022, the contents of which are incorporated herein by reference in its entirety.

FIELD OF THE DISCLOSURE

The invention relates to a method for operating a transmission that is arranged in a drivetrain of a motor vehicle between a drive aggregate and a drive output. Furthermore, the invention relates to a control unit designed to carry out the method, and to a corresponding computer program for implementing the method on the said control unit. In addition, the invention relates to a transmission and to a motor vehicle with a transmission.

SUMMARY

A drivetrain of a motor vehicle comprises a drive aggregate and a transmission connected between the drive aggregate and a drive output. The transmission converts rotation speeds and torques, and thus supplies the drive output with a traction force. Between the drive aggregate and the transmission there can be connected a hydrodynamic starting element with a converter and a converter bridging clutch.

From prior practice it is already known that the transmission can be made in the form of a group transmission. A group transmission comprises a main transmission also known as the main group. The main transmission serves to provide a number of frictional forward gears and at least one frictional reversing gear. The main transmission can be powershiftable and in that case comprises a plurality of frictional shifting elements. Downstream from the main transmission or main group is connected a downstream range group, which is connected between the output shaft of the main transmission and the drive output.

While the motor vehicle is at rest, if the downstream range group is to be shifted, then according to the prior art the main transmission is first shifted to neutral, and the downstream range group is likewise shifted from the driving range to be disengaged into neutral.

As a result of drag losses in the powershiftable main transmission, the output shaft of the main transmission can be accelerated to a rotation speed that subsequently no longer allows the downstream range group to be shifted from neutral into the gear to be engaged. The driver would then have to switch off the drive aggregate in order to shift the downstream range group into the driving range to be engaged. If there is a hydraulically switched downstream transmission, there is no longer sufficient hydraulic pressure available to switch it when the drive aggregate is switched off.

Accordingly, there is a need for a method and a control unit for operating a transmission, with the help of which reliable shifting of the downstream range group can be enabled.

DE 10 2011 076 964 A1 discloses a method for operating a motor vehicle with a drive aggregate and a transmission connected between the drive aggregate and a drive output. In this case the transmission is in the form of a group transmission with a powershiftable main transmission and a claw-shifted downstream range group. A hydrodynamic starting element is connected between the main transmission and the drive aggregate. DE 10 2011 076 964 A1 relates to a method for shifting the downstream range group while the motor vehicle is driving, and this in combination with carrying out a gearshift in the powershiftable main transmission.

Starting from there, the purpose of the present invention is to provide a new type of method and a control unit for operating a transmission arranged in a drivetrain of a motor vehicle between a drive aggregate and a drive output.

From a process-technological standpoint this objective is achieved by a method as variously disclosed herein. A control unit designed to carry out the method according to the invention is also disclosed. Further disclosed are a computer program for carrying out the method on a control unit of that type and a transmission with such a control unit and a motor vehicle with such a transmission. Advantageous further developments will be apparent in light of the present disclosure.

According to the present invention, a method is proposed for operating a transmission that is arranged in a drivetrain of a motor vehicle between a drive aggregate and a drive output. The transmission comprises a hydrodynamic starting element and a powershiftable main transmission, which provides a plurality of forward gears and at least one revering gear. The hydrodynamic starting element can be in the form of a hydrodynamic torque converter with a converter bridging clutch, for example.

The powershiftable main transmission comprises a transmission input and a transmission output, and a plurality of frictional shifting elements, of which in each gear a first number of shifting elements are closed and a second number of shifting elements are open. The frictional shifting elements can be in the form of disk clutches and/or disk brakes. The shifting elements can be designed to be actuated by a pressure medium, for example hydraulically or pneumatically. In particular, the lubricant of the vehicle transmission is used as the pressure medium. The actuation of the shifting elements is controlled by a control unit, which can preferably be in the form of a transmission control unit. Thus, the control unit brings about the actuation of the frictional shifting elements as the situation requires.

The motor vehicle can be, for example, a passenger car or a utility vehicle such as a truck or an omnibus. The motor vehicle can also be a rail vehicle or an agricultural vehicle.

The transmission also comprises a downstream range group connected downstream from the powershiftable main transmission. Such a downstream range group can be a transmission group of the transmission which can serve to provide a slow driving range and a fast driving range. The downstream range group can also be in the form of a splitter transmission and serve to provide an all-wheel driving range and a non-all-wheel driving range. The downstream range group can also be in the form of a so-termed split-shaft distributor transmission, by means of which the power of the drive aggregate can be transmitted to one or more ancillary aggregates of the motor vehicle.

The downstream range group comprises at least one interlocking shifting element, by means of which the downstream range group can be shifted between a first driving range and a second driving range. The interlocking shifting element can be, for example, a claw-type shifting element. The interlocking shifting element or claw shifting element can be of the unsynchronized type. In particular, the interlocking shifting element can be a shifting clutch.

The interlocking shifting element can be adjusted by means of an adjustment device, which can be in the form of a shift actuator. The shift actuator can be in the form of a hydraulically or pneumatically operated actuating cylinder or an electrical actuator, by means of which a shifting mechanism of the downstream range group is actuated in order to adjust the interlocking shifting element during a gearshift process.

When its drive aggregate is running, the motor vehicle is at a standstill or in a speed range close to standstill, a shift request to shift the downstream range group is made and the powershiftable main transmission is in neutral, according to the invention it is provided that shifting elements of the main transmission are actuated in such manner that the transmission input of the main transmission is braced against a transmission housing and hence braked, while the transmission input and the transmission output are decoupled from one another. Thereafter, the downstream range group is shifted by actuating the interlocking shifting element of the downstream range group.

The shift request to shift the downstream range group can be triggered, for example, by the driver of the motor vehicle and/or automatically by the control unit. To shift the downstream range group and change to neutral in the powershiftable main transmission, a driving switch of the transmission can be moved to a driving switch position "Neutral" or preferably to a driving switch powershift "Drive."

Shifting the downstream range group is preferably understood to mean a process in which a shifting element half of the interlocking shifting element, in particular a shifting sleeve, is brought into functional connection with or separated from a second shifting element half of the interlocking shifting element, in particular a clutch body of a gearwheel. Thus, switching of the downstream range group can be understood to mean shifting out of one driving range into another driving range, shifting out of a driving range into neutral, and shifting out of neutral into a driving range.

When a shift request to shift the downstream range group has been received, if the downstream range group is in neutral, then in a first embodiment of the invention it is provided that in order to engage a driving range the interlocking shifting element is actuated when the rotation speed of the output shaft of the main transmission has reached a shifting rotation speed of the downstream range group. Since the transmission input is blocked and the transmission output is decoupled from the transmission input of the main transmission, the rotation speed of the output shaft brought about by drag losses in the main transmission falls due to frictional losses. If the rotation speed of the output shaft of the main transmission has reached the shifting rotation speed for engaging the driving range of the downstream range group, the driving range of the downstream range group can be engaged by actuating the interlocking shifting element of the downstream range group. The shifting rotation speed of the downstream range group can be, for example, within a rotation speed range of 10 rpm to 60 rpm, preferably a rotation speed range of 20 rpm to 40 rpm.

To reach the shifting rotation speed for engaging the driving range of the downstream range group, the output shaft of the main transmission can be braked by partially closing at least one further shifting element of the main transmission. In that way the output shaft of the main transmission can be brought more quickly to the shifting rotation speed of the downstream range group. The at least one further shifting element is in this case operated with slip deliberately, so that blocking of the main transmission can be reliable avoided. For example, the partial closing can take place along a ramp in accordance with a desired pressure specification. The shifting element of the main transmission for braking the output shaft of the main transmission can be in the form of a disk clutch or a disk brake.

The probability that during the engagement of a driving range in the downstream range group a tooth-on-tooth position might occur in the form of rattling or a direct coupling, can be reduced by virtue of the method according to the invention. A tooth-on-tooth position in the form of rattling occurs when shifting claws of the interlocking shifting element with different rotation speeds slide over one another. Owing to the sliding of the shifting claws over one another the engagement of the driving range to be engaged is then impeded. Since the downstream range group is shifted when the rotation speed of the output shaft has reached the shifting rotation speed for engaging the driving range, rattling of the interlocking shifting element when the driving range is being engaged in the downstream range group can be avoided, which would otherwise result in typical noise emission. This increases shifting comfort.

In contrast, a tooth-on-tooth position in the form of a direct coupling occurs when shifting claws of the interlocking shifting element stick to one another and rotate at the same rotation speed. Then, owing to the sticking of the shifting claws of the interlocking shifting element to one another, the new driving range cannot be engaged in the downstream range group. Since the shifting of the downstream range group already takes place when the rotation speed of the output shaft has reached the shifting rotation speed for engaging the driving range of the downstream range group, the probability can be reduced that a direct coupling will occur while the new driving range in the downstream range group is being engaged.

If, while engaging the driving range in the downstream range group, a tooth-on-tooth position at the interlocking shifting element should nevertheless occur, it is provided that at least one of the actuated shifting elements of the main transmission, by means of which the transmission input is braced against the transmission housing, is actuated in such manner that the output shaft of the main transmission rotates. The shifting element of the main transmission actuated in order to resolve the tooth-on-tooth position can be actuated, for example, in a pulsating or saw-tooth manner. By virtue of the then rotating output shaft of the main transmission, the tooth-on-tooth position at the interlocking shifting element of the downstream range group can be resolved.

A rotation speed of the output shaft of the main transmission can be determined, and the shifting elements of the main transmission can in particular then be actuated in order to brace the transmission input of the main transmission when the rotation speed of the output shaft of the main transmission when a shift request to shift the downstream range group is made, is higher than a maximum permitted shifting rotation speed for engaging the driving range of the downstream range group. For example, the rotation speed of the output shaft can be determined by a rotation speed sensor. In that way the shifting elements of the main transmission for bracing the transmission input of the main transmission can be actuated selectively when the rotation speed of the output shaft of the main transmission exceeds a maximum permissible shifting rotation speed.

In contrast, if, when a shifting request to shift the downstream range group has been made and the downstream range group is engaged in a driving range, then in another embodiment of the invention it is provided that in order to disengage the driving range the interlocking shifting element of the downstream range group is actuated when it is free or nearly free from load. Since the transmission input of the main transmission is braced against the transmission housing and is decoupled from the transmission output of the main transmission, the torque on the downstream range group transmitted to the downstream range group on account of the drag losses prevailing in the main transmission, and hence also the load acting upon the interlocking shifting element when disengaging the driving range, is reduced. The interlocking shifting element can in this case be actuated with a disengagement force which results in disengagement of the interlocking shifting element when it is free or almost free from load.

A transmission condition of the main transmission can be determined, such that the shifting elements of the main transmission are in particular actuated in order to brace the transmission input when a shift request to shift the downstream range group is received, in a condition of the main transmission in which drag losses in the main transmission are elevated. When drag losses in the main transmission are high, if the downstream range group is in neutral, then due to the high drag losses the output shaft of the main transmission will in any event be accelerated to a rotation speed above the shifting rotation speed of the downstream range group. If the downstream range group is in an engaged driving range, the elevated drag losses in the main transmission produce a load that acts upon the interlocking shifting element which impedes the disengagement of the driving range by a maximum permissible disengagement force, Accordingly, the shifting elements of the main transmission can be actuated to brace the transmission input of the main transmission when a transmission condition with elevated drag losses exists. The transmission condition with elevated drag losses exists in particular when the vehicle transmission has not yet reached a sufficiently high temperature. When the transmission is cool the lubricant in it (usually transmission oil) has relatively high viscosity. Component frictions and splash losses are correspondingly high, whereby an undesired torque is transmitted to the output shaft of the main transmission. This transmission condition is therefore in particular equivalent to a "cold" vehicle transmission. The condition can for example exist when the transmission lubricant is lower than a particular temperature, for example 40° C.

The proposed method enables reliable shifting of a downstream range group of a transmission with a powershiftable main transmission, even if drag losses in the main transmission would negatively affect the shifting of the downstream range group. The downstream range group can be shifted quietly and with little wear.

The proposed method is controlled by the also proposed control unit, which can for example be in the form of a transmission control unit. This means that the method is carried out by the control unit.

Accordingly, the proposed control unit is specially designed to carry out the method with its respectively indicated steps. For that purpose, the control unit comprises in particular an input, an output, and calculation means. For this purpose, the control unit also comprises a storage medium, for example a data memory, in which the commands especially necessary for implementation are stored. The input of the control unit is designed such that by way of it the information required can be sent to the control unit, for example the occurrence of a shift request to shift the downstream range group, the current speed of the vehicle and/or the rotation speed of the output shaft of the main transmission. The output of the control unit is designed to emit the control signals needed in order to actuate the shifting elements, for example signals for opening and closing valves of the shifting elements, whereby the shifting elements are pressurized. The calculation means carries out the commands stored in the storage means, for which purpose it processes the incoming information and emits the corresponding control signals for the shifting elements. The calculation means are in particular a microprocessor.

A computer program according to the invention is designed to enable a control unit to carry out the method according to the invention or a preferred further development thereof when the computer program is run in the control unit. In this connection, the object of the invention also includes a computer-readable medium on which the aforesaid computer program is stored and from which it can be executed.

Below, the invention is explained in greater detail with reference to figures from which further preferred embodiments and features of the invention can be seen. The figures show:

DETAILED DESCRIPTION

Figure 1:
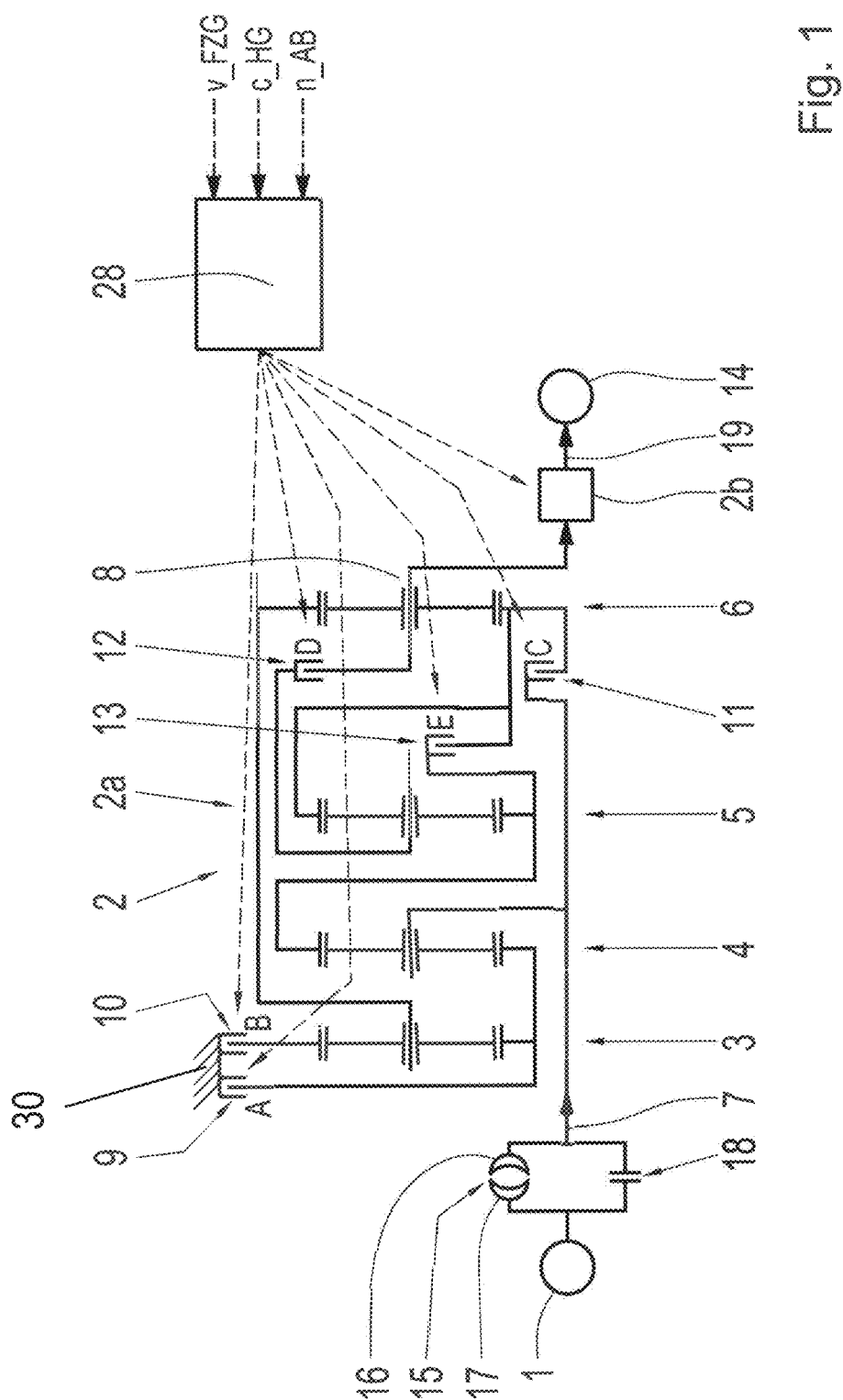
FIG. 1: An example of a drivetrain scheme of a motor vehicle, with an example of a transmission comprising a main transmission and a downstream range group.

FIG. 1 shows, very schematically, an example of a drivetrain of a motor vehicle. The drivetrain of FIG. 1 comprises a drive aggregate 1, a transmission 2, and a drive output 14, the transmission 2 being connected between the drive aggregate 1 and the drive output 14. The drive aggregate 1 can be, for example, an internal combustion engine or an electric motor.

The transmission 2 comprises a main transmission 2a which provides a number of forward gears and a reversing gear, and a downstream range group 2b connected downstream from the main transmission 2a on the drive input side, which provides a first driving range and a second diving range. The first driving range can correspond to a slow driving range and the second gear to a fast driving range. The first driving range can be an all-wheel driving range and the second driving range can be a non-all-wheel driving range.

Between the drive aggregate 1 and the transmission 2, namely—in the example embodiment shown—between the drive aggregate 1 and the main transmission 2a, there is connected a hydrodynamic starting element with a converter 15 and a converter bridging cutch 18. A converter comprises a turbine 16, wherein the turbine 16 in the example embodiment shown is coupled rotationally fixed to an input shaft 7 of the main transmission 2a. In addition, a converter 15 comprises a pump 17. The pump 17 is coupled rotationally fixed to the drive aggregate 1. The structure of such a converter 15 is known to those familiar with the subject, to whom this is addressed.

Between the main transmission 2a of the transmission 2 and the drive output 14 is connected the downstream range group 2b of the transmission 2, this downstream range group 2b being coupled to a drive output shaft 8 of the main transmission 2a.

In the example embodiment shown, the main transmission 2a of the transmission 2 comprises a plurality of gearsets 3, 4, 5, and 6, and a plurality of frictional shifting elements 9, 10, 11, 12, and 13 which co-operate with the said gearsets 3, 4, 5, and 6, wherein the two shifting elements 9 and 10 are also called shifting elements A and B, respectively, and wherein the shifting elements 11, 12, and 13 are also called shifting elements C, D, and E, respectively. The shifting elements A and B and also the shifting elements C, D, and E are frictional shifting elements in each case, namely, such that the shifting elements A and B are brakes and the shifting elements C, D, and E are clutches. The shifting elements A and B are disk brakes and the shifting elements C, D, and E are disk clutches.

In FIG. 1 a control unit 28 is also shown, which serves to actuate the shifting elements A, B, C, D, E of the main transmission 2a and of the downstream range group 2b. Thus, the control unit 28 enables the shifting elements of the transmission 2 to be selectively opened and closed. Thereby, the gear appropriate for the respective situation or the gear called for by a driver of the vehicle is engaged. For that purpose, the requisite information is sent to the control unit 28 by way of the control unit's input. The control unit 28 processes this information and emits corresponding signals for actuating the shifting elements of the transmission 2 by way of the control unit's output. However, it is also conceivable for respective control units of their own to be associated with the main transmission 2a and with the downstream range group 2b, which enable the actuation of the shifting elements in the respective parts of the transmission. These control units can then communicate with one another, for example by way of a CAN (Controller Area Network) data bus.

Among other things and only as an example, the information signals v_FZG, c_HG and n_AB are sent to the control unit 28. The information signal v_FZG is a speed of the motor vehicle, by way of which a standstill or a speed range close to standstill of the motor vehicle can be recognized. The speed signal v_FZG can be determined, for example, by a speed sensor or from the rotation speed of the output shaft of the downstream range group. The information c_HG is a temperature signal that represents the transmission temperature of the main transmission 2a. The temperature signal c_HG can be determined, for example, by a temperature sensor of the transmission 2. The information n_AB is a rotation speed signal that represents the rotation speed at the output shaft 8 of the main transmission 2a. The control unit 28 is also informed of a shift request to shift the downstream range group 2b when that is called for by the driver of the motor vehicle or by the control unit.

Usually, the shifting elements of the main transmission 2a are actuated by a pressure medium. For that purpose, each shifting element A, B, C, D, E of the main transmission 2 is associated with an actuation piston that can be acted upon individually by the pressure of the pressure medium. For this, the valves associated with the actuation pistons are operated by the control unit 28. As the pressure medium, with the main transmission 2a shown in FIG. 1 the lubricant of the main transmission 2a (transmission oil) is usually used.

Figures 2, 3:
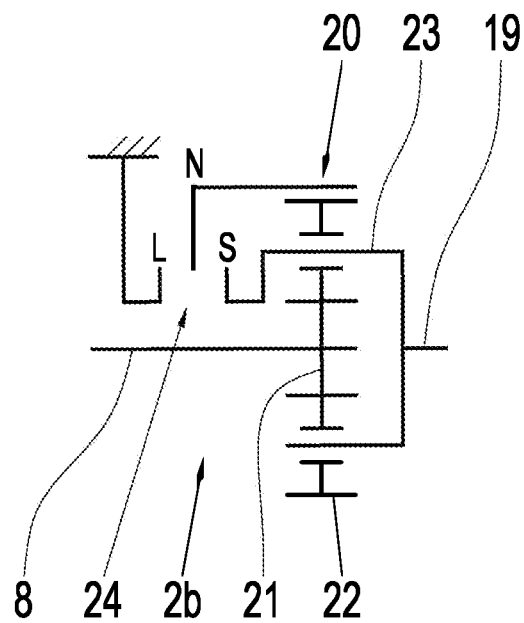
FIG. 2: A shifting matrix of the main transmission in FIG. 1.
FIG. 3: A possible design of the downstream range group in FIG. 1.

FIG. 2 shows a shifting matrix for the main transmission 2a of the transmission 2 in FIG. 1. From FIG. 2 it can be seen that with the main transmission 2a of the transmission 2 in FIG. 1 a total of eight frictional and hence traction-force-transmitting forward gears D1 to D8 and one frictional and hence traction-force-transmitting reversing gear R can be obtained. In each of these traction-force-transmitting gears D1 to D8 and R, a defined first number of shifting elements, namely, three shifting elements of the main transmission 2a are closed, whereas on the other hand a defined second number of shifting elements, namely, two shifting elements of the main transmission 2a are in each case open in each traction-force-transmitting and hence frictional gear.

The shifting elements of the main transmission 2a which are closed in each respective frictional and hence traction-force-transmitting gear, are indicated by spots in FIG. 2. For example, in forward gear D1 of the main transmission 2a the shifting elements A, B, and C are closed and in forward gear D2 of the main transmission 2a the shifting elements A, B, and E are closed. In the reversing gear R of the main transmission 2a the shifting elements A, B, and D are closed. The shifting elements that are closed in forward gears D3, D4, D5, D6, D7, and D8 of the main transmission 2a can be seen in the same way in the shifting matrix of FIG. 2.

As already stated, the downstream range group 2b is connected between the output shaft 8 of the main transmission 2a and the drive output 14 of the downstream range group 2b. In this case, as shown as an example in FIG. 3, the downstream range group 2b can be made such that as in FIG. 3 the downstream range group 2b comprises a planetary gearset 20 and an interlocking shifting element 24. The output shaft 8 of the main transmission 2a is coupled to a sun gear of the planetary gearset 20. The drive output 14 is coupled to a web 23 of the planetary gearset 20 by way of an output shaft 19 of the downstream range group 2b. Depending on the shift position of the interlocking shifting element 24, a ring gear 22 of the planetary gearset 20 is either fixed to the housing in the slow driving range L or coupled to the web 23 in the fast driving range S.

Figure 4:
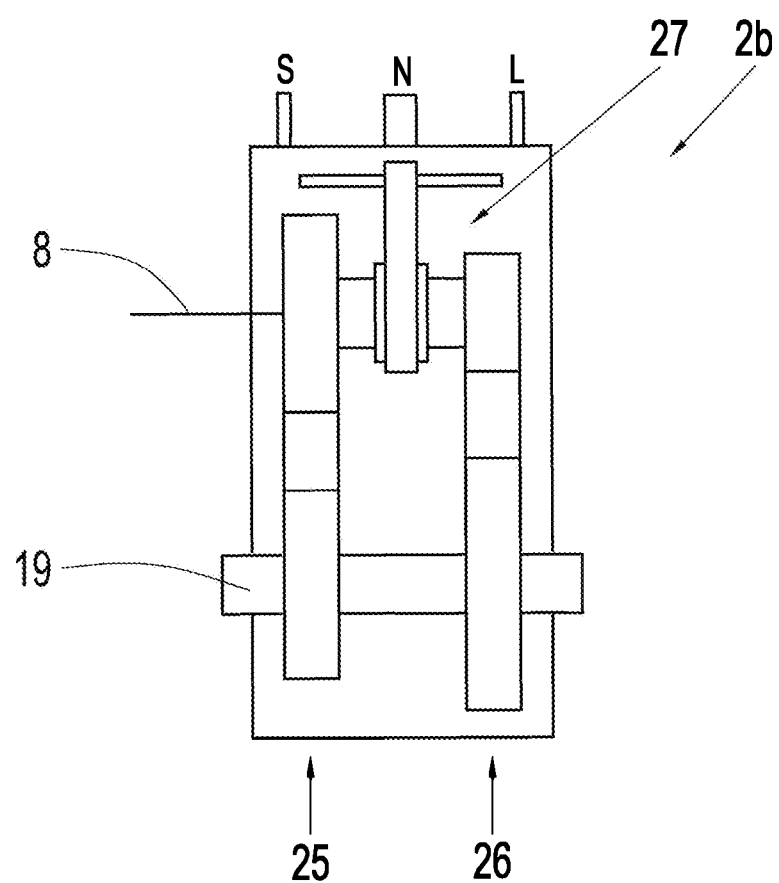
FIG. 4: An alternative design of the downstream range group in FIG. 1.

FIG. 4 shows an alternative design of the downstream range group 2b which, otherwise than in FIG. 3, is not of planetary design but rather of spur gear design. Thus, the downstream range group 2b in FIG. 4 comprises two spur gear stages 25 and 26, and an interlocking shifting element 27. Depending on the shift position of the interlocking shifting element 27, the output shaft 8 of the main transmission 2a is coupled to the output shaft 19 of the downstream range group 2b either by way of the spur gear stage 25 or by way of the spur gear stage 26.

The invention now relates to a method for shifting the downstream range group 2b of the transmission 2 in a safe and reliable manner. For this, it is provided that when, with its drive aggregate 1 running, the motor vehicle is at a standstill or in a range close to a standstill, the powershiftable main transmission 2a is in neutral, and a shift request to shift the downstream range group 2b is received, shifting elements 9, 11, and 13 of the main transmission 2a are actuated in such manner that the transmission input of the main transmission 2a is braced against the transmission housing 30. Thus, in the main transmission 2a of the transmission 2 in FIG. 1, in order to brace the transmission input of the main transmission 2a, the shifting element 9 in the form of a disk brake, the shifting element 11 in the form of a disk clutch, and the shifting element 13 in the form of a disk clutch are fully closed. Consequently, the transmission input of the main transmission 2a is braced against the transmission housing 30, whereas the transmission input and the transmission output of the main transmission 2a are decoupled from one another. In that way, despite the drag losses in the main transmission 2a, on the one hand the output shaft 8 of the main transmission 2a can be synchronized to a rotation speed at which the downstream range group 2b can be shifted from neutral into a driving range, and on the other hand the interlocking shifting element 24, 27 of the downstream range group 2b becomes free from load or almost so, in order to disengage a driving range of the downstream range group 2b.

Thus, a shift of the downstream range group 2b of the transmission 2 can take place reliably, quietly, and with little wear.

INDEXES

1 Drive aggregate
2 Transmission
2a Main transmission
2b Downstream range group
3 Gearset
4 Gearset
5 Gearset
6 Gearset
7 Input shaft of the main transmission
8 Output shaft of the main transmission
9 Shifting element A
10 Shifting element B
11 Shifting element C
12 Shifting element D
13 Shifting element E
14 Drive output
15 Converter
16 Turbine
17 Pump
18 Converter bridging clutch
19 Output shaft of the downstream range group
20 Planetary gear system
21 Sun gear
22 Ring gear
23 Web
24 Shifting element
25 Spur gear stage
26 Spur gear stage
27 Shifting element
28 Control unit

The invention claimed is:

1. A method for operating a transmission arranged in a drivetrain of a motor vehicle between a drive aggregate and a drive output, the method comprising:
   providing the transmission comprising
      a transmission housing,
      a hydrodynamic starting element,
      a powershiftable main transmission having a plurality of forward gears, at least one reversing gear, a transmission input, a transmission output, and a plurality of frictional shifting elements, wherein in each gear three of the frictional shifting elements are closed and two of the frictional shifting elements are open, and
      a downstream range group being connected to the transmission output downstream from the powershiftable main transmission and comprising at least one interlocking shifting element configured to be shifted between a first driving range and a second driving range;
   receiving a shift request to shift the downstream range group when the drive aggregate is running, the motor vehicle is either at a standstill or in a speed range close to standstill, and the powershiftable main transmission is in neutral;
   actuating the frictional shifting elements of the powershiftable main transmission such that the transmission input of the powershiftable main transmission is rotationally fixed to the transmission housing and decoupled from the transmission output of the shiftable main transmission; and
   shifting the downstream range group.

2. The method according to claim 1, comprising:
   shifting the downstream range group to neutral;
   detecting that a rotation speed of an output shaft of the powershiftable main transmission has reached a shifting rotation speed of the downstream range group; and
   actuating the interlocking shifting element for engaging either the first driving range or the second driving range of the downstream range group.

3. The method according to claim 2, comprising:
   braking the output shaft of the powershiftable main transmission by partially closing of at least one further frictional shifting element of the shiftable main transmission.

4. The method according to claim 2, comprising:
   detecting a tooth-on-tooth position at the interlocking shifting element during the engagement of the first or the second driving range in the downstream range group; and
   actuating at least one of the frictional shifting elements, via which the transmission input of the powershiftable main transmission is rotationally fixed to the transmission housing, such that the output shaft of the powershiftable main transmission rotates.

5. The method according to claim 4, wherein actuating the frictional shifting element of the powershiftable main transmission is performed in a pulsed or saw-toothed manner, thereby resolving the tooth-on-tooth position.

6. The method according to any of claim 2, comprising:
   determining that a rotation speed of the output shaft of the vershiftable main transmission is higher than a maximum permissible shifting rotation speed for engaging the first or the second driving range in the downstream range group; and
   actuating the frictional shifting elements, thereby bracing the transmission input of the powershiftable main transmission.

7. The method according to claim 1, comprising:
   determining that the interlocking shifting element is free from load or nearly so while a driving range is engaged in the downstream range group; and
   actuating the interlocking shifting element of the downstream range group for disengaging the driving range.

8. The method according to claim 1, comprising:
   determining that a transmission condition of the powershiftable main transmission has elevated drag losses; and
   actuating the frictional shifting elements, thereby bracing the transmission input of the powershiftable main transmission.

9. A control unit configured to carry out the method according to claim 1.

10. A computer program product having executable code that when executed by a control unit carries out the method according to claim 1.

11. A transmission of a motor vehicle, comprising the powershiftable main transmission and the downstream range group connected downstream from the powershiftable main transmission, wherein the transmission of the motor vehicle comprises a control unit configured to carry out the method according to claim 1.

12. A motor vehicle with a transmission comprising the powershiftable main transmission and the downstream range group connected downstream from the powershiftable main transmission, wherein the transmission of the motor vehicle comprises a control unit configured to carry out the method according to claim 1.

* * * * *